US008550426B2

(12) United States Patent
Johnson et al.

(10) Patent No.: US 8,550,426 B2
(45) Date of Patent: Oct. 8, 2013

(54) TWO STEP PARK BRAKE RELEASE

(75) Inventors: Duane R. Johnson, Wellington, OH (US); Rebecca Carter, Medina, OH (US); Mark H. Sciulli, Lorain, OH (US); Scott R. Weslow, Ravenna, OH (US); Timothy J. Beckwith, Berlin Heights, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 415 days.

(21) Appl. No.: 13/009,376

(22) Filed: Jan. 19, 2011

(65) Prior Publication Data
US 2012/0181139 A1    Jul. 19, 2012

(51) Int. Cl.
*F16K 35/00*    (2006.01)

(52) U.S. Cl.
USPC ............. 251/101; 251/104; 251/105; 251/95; 251/100; 251/319

(58) Field of Classification Search
USPC ........... 251/101, 104, 105, 100, 95, 319, 320, 251/321, 323
See application file for complete search history.

(56) References Cited

U.S. PATENT DOCUMENTS

| | | | |
|---|---|---|---|
| 1,077,231 A | 10/1913 | Pitt | |
| 1,151,751 A | 8/1915 | Barenz | |
| 1,644,578 A * | 10/1927 | George | 251/105 |
| 1,667,525 A * | 4/1928 | Bashcongi | 251/105 |
| 2,547,098 A | 1/1948 | Smith et al. | |
| 2,501,008 A * | 3/1950 | Schramm | 74/548 |
| 2,678,186 A * | 5/1954 | Blackford | 251/105 |
| 3,012,584 A * | 12/1961 | Carlson et al. | 137/636.4 |
| 3,220,695 A | 11/1965 | Downey et al. | |
| 3,664,632 A | 5/1972 | Valentine | |
| 3,679,170 A | 7/1972 | Bernas et al. | |
| 3,782,251 A | 1/1974 | Le Marchand | |
| 4,299,102 A | 11/1981 | Aro | |
| 4,532,826 A | 8/1985 | White | |
| 4,544,132 A | 10/1985 | Allen et al. | |
| 4,603,600 A | 8/1986 | Yamazaki | |
| 4,643,043 A | 2/1987 | Furuta et al. | |
| 4,691,895 A * | 9/1987 | Garff | 251/292 |
| 5,129,282 A | 7/1992 | Bassett et al. | |
| 5,228,646 A * | 7/1993 | Raines | 251/95 |
| 5,415,645 A * | 5/1995 | Friend et al. | 604/110 |
| 5,513,831 A * | 5/1996 | Seward | 251/96 |

(Continued)

OTHER PUBLICATIONS

Bendix Service Data, Bendix MV-3 Dash Control Module, 6 pgs., BW1613 © 2008, Bendix Commercial Vehicle Systems LLC, May 2008.

(Continued)

*Primary Examiner* — John K Fristoe, Jr.
*Assistant Examiner* — Minh Le
(74) *Attorney, Agent, or Firm* — Fay Sharpe LLP

(57) ABSTRACT

A dual-motion collar device is described, which elicits an additional motion from an operator when initiating a parking brake release in a vehicle. The collar device comprises top and bottom collars with a compressed and torsionally stressed spring there between, such that the collar device maintains a park brake plunger knob in a locked state. An operator twists the top collar to align interlocking features on the top and bottom collars, and then pushes downward to unlock the collar device. The operator then pushes downward on a park brake plunger knob around which the collar device is installed to actuate a parking brake valve assembly and release the parking brake.

20 Claims, 4 Drawing Sheets

(56) References Cited

U.S. PATENT DOCUMENTS

| | | | |
|---|---|---|---|
| 5,551,124 A * | 9/1996 | Zeringue | 16/441 |
| 5,577,418 A | 11/1996 | Traxler et al. | |
| 5,653,420 A * | 8/1997 | Sell | 251/95 |
| 5,741,003 A * | 4/1998 | Segien, Jr. | 251/95 |
| 5,762,317 A * | 6/1998 | Frahm et al. | 251/95 |
| 5,839,304 A | 11/1998 | Wills | |
| 6,438,771 B1 * | 8/2002 | Donath et al. | 4/678 |
| 6,729,696 B2 | 5/2004 | Kemer et al. | |
| 6,997,522 B2 | 2/2006 | Kemer | |
| 7,073,873 B2 | 7/2006 | Kemer | |
| 7,100,888 B1 | 9/2006 | Johnson | |
| 7,497,293 B2 | 3/2009 | Saieg et al. | |
| 8,075,522 B2 * | 12/2011 | Larsen et al. | 604/110 |

OTHER PUBLICATIONS

International Search Report and Written Opinion of the International Searching Authority, Authorized Officer Blaine R. Copenheaver, Date of Mailing May 3, 2012, Date Completion of Search Apr. 23, 2012, 11 pgs.

* cited by examiner

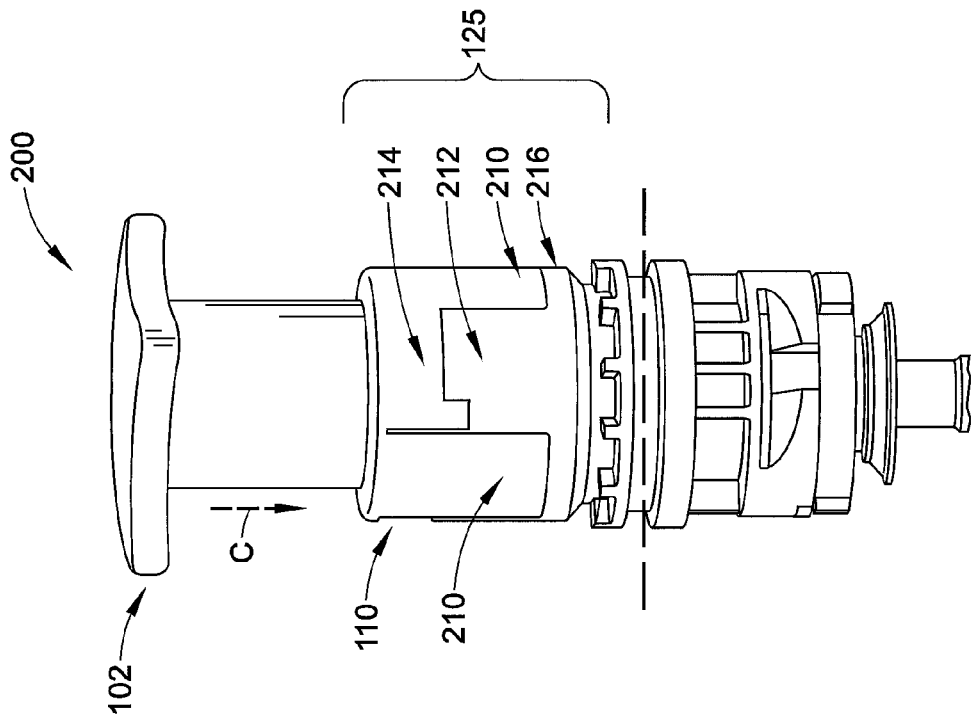
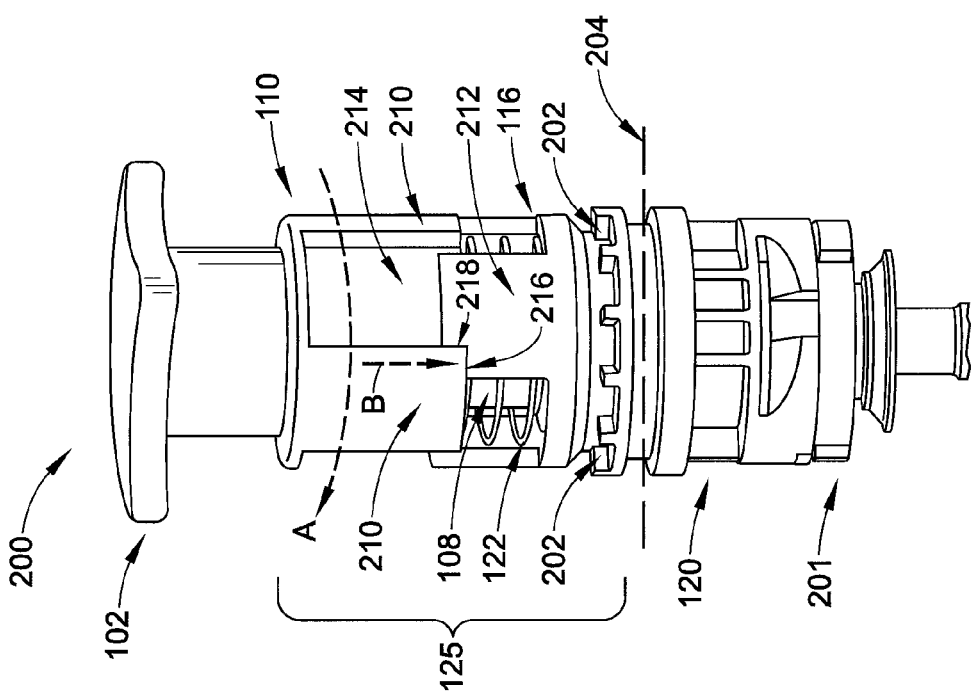
FIG. 2
FIG. 3

TWO STEP PARK BRAKE RELEASE

BACKGROUND

The present application finds particular application in parking brake systems in vehicles, particularly involving pneumatic parking brake systems. However, it will be appreciated that the described technique may also find application in other brake control systems, other valve actuation systems, or other pneumatic control systems.

Conventional single-motion parking brake release mechanisms suffer from many drawbacks, including unintentional parking brake release, which can cause a vehicle to roll unexpectedly and cause injury and/or property damage. For instance, such systems typically employ a plunger knob that an operator pulls outward to actuate the parking brake system. When the operator wants to release the parking brake, the operator pushes the plunger knob inward to a released position, which permits air to be supplied to a parking brake system and causes the parking brake to be deactivated. However, using such an arrangement increases the occurrence of inadvertent or accidental brake release. For instance, an operator or occupant may inadvertently depress the knob into a released position; a pet that travels with the operator in the cab of his truck may depress the knob into a released position when looking out through the windshield, etc. In these cases, if the release of the parking brake is not immediately noticed, the vehicle can roll away and cause damage to property or worse, injury to people.

The present innovation provides a new and improved parking brake release system, which overcomes the above-referenced problems and others.

SUMMARY

In accordance with one aspect, a two-stage parking brake release actuation system comprises a collar device that includes a compressed and torsionally loaded spring that maintains the collar device in a locked position in which actuation of a brake release plunger knob is prevented, a plunger stem over which the collar device is installed and which passes through the spring in the collar device, and a plunger guide to which the plunger stem and the collar device are coupled. The system further comprises a plunger knob that is coupled to the plunger stem and which holds the collar device in place between the plunger knob and the plunger guide. The collar device is rotatable and compressible to unlock the collar device in order to permit actuation of the plunger knob.

According to another aspect, the collar device comprises a top collar with first interlocking features and first recesses, and a bottom collar with second interlocking features and second recesses between the interlocking features.

In another embodiment, the second interlocking features each comprise a horizontal interlocking surface that prevents the top collar from being depressed to unlock the collar device and permit plunger knob actuation.

According to another feature, the second interlocking features each comprise a vertical interlocking surface against which the spring torsionally forces respective first interlocking features, wherein each first interlocking feature includes a first camming surface, and wherein each second interlocking feature includes a second camming surface.

In yet another embodiment, the top collar is rotatable to align the first interlocking features with corresponding second interlocking recesses, and align the second interlocking features with corresponding first interlocking recesses, and wherein the top collar is depressible to compress the spring and unlock the collar device to permit actuation of the plunger knob.

According to another aspect, the camming surfaces interface when the top collar is depressed into an unlocked position, and wherein upon release of the top collar by an operator, the compressed spring forces the top collar upward while the camming surfaces interact to increase torsional load in the spring, and wherein the axial load forces the interlocking features back toward the vertical interlocking surface once the spring has forced the top collar upward.

According to another feature, the top collar is rotatable by an operator to align the first interlocking features with corresponding second interlocking recesses, and align the second interlocking features with corresponding first interlocking recesses, and wherein the top collar is depressible by the operator to compress the spring and unlock the collar device to permit actuation of the plunger knob.

In accordance with another aspect, upon release of the top collar by the operator, the compressed spring forces the top collar upward, and wherein the torsional load on the spring forces the interlocking features back toward the vertical interlocking surface once the spring has forced the top collar upward.

In another embodiment, the spring includes a tang at each end, and wherein each of the top collar and the bottom collar includes a receiving hole into which the tangs are inserted to couple the spring to the top collar and the bottom collar respectively, such that a first end of the spring is stationary relative to the top collar and a second end of the spring is stationary relative to the bottom collar, and wherein rotation of the top collar adjusts torsional load on the spring.

According to another aspect, the plunger knob passes through at least a portion of the collar device.

In accordance with another aspect, a collar device that facilitates locking a plunger knob in position to prevent accidental actuation of the plunger knob comprises a top collar with first interlocking features and first recesses, and a bottom collar with second interlocking features and second recesses between the interlocking features. The collar device further comprises a spring interposed between, and coupled to, the top collar and the bottom collar, the spring being torsionally loaded and compressible so that the top collar remains in locked position relative to the bottom collar and prevents unintentional actuation of a plunger knob on which the collar device is mounted.

In another embodiment, the second interlocking features each comprise a horizontal interlocking surface that prevents the top collar from being depressed to unlock the collar device and permit plunger knob actuation.

According to another aspect, the second interlocking features each comprise a vertical interlocking surface against which the spring torsionally forces respective first interlocking features and maintains the top collar in the locked position.

According to another feature, each first interlocking feature includes a first camming surface, and wherein each second interlocking feature includes a second camming surface.

In accordance with another aspect, the top collar is rotatable to align the first interlocking features with corresponding second interlocking recesses, and align the second interlocking features with corresponding first interlocking recesses, and wherein the top collar is depressible to compress the spring and unlock the collar device to permit actuation of the plunger knob.

According to another feature, the camming surfaces interface when the top collar is depressed into an unlocked position, and wherein upon release of the top collar by an operator, the compressed spring forces the top collar upward while the camming surfaces interact to increase torsional stress in the spring, and wherein the torsional load forces the interlocking features back toward the vertical interlocking surface once the spring has forced the top collar upward.

In another embodiment, the top collar is rotatable by an operator to align the first interlocking features with corresponding second interlocking recesses, and align the second interlocking features with corresponding first interlocking recesses, and wherein the top collar is depressible by the operator to compress the spring and unlock the collar device to permit actuation of the plunger knob.

In accordance with another aspect, upon release of the top collar by the operator, the compressed spring forces the top collar upward, and wherein the torsional load on the spring forces the interlocking features back toward the vertical interlocking surface once the spring has forced the top collar upward.

According to another feature, the spring includes a tang at each end, and wherein each of the top collar and the bottom collar includes a receiving hole into which the tangs are inserted to couple the spring to the top collar and the bottom collar respectively, such that a first end of the spring is stationary relative to the top collar and a second end of the spring is stationary relative to the bottom collar, and wherein rotation of the top collar adjusts torsional load on the spring.

In another embodiment, the bottom collar includes a plurality of tabs that couple the collar device to a plunger guide, which is also coupled to a plunger stem that passes through the spring in the collar device and is coupled to the plunger knob at an opposite side of the collar device.

In accordance with yet another aspect, the plunger guide is coupled to a parking brake control valve, and wherein depression of the plunger knob actuates a parking brake release mechanism and pulling of the plunger knob permits the spring to return the collar device to a locked position.

One advantage is that unintentional parking brake release is mitigated.

Another advantage is that vehicle safety is improved.

Still further advantages of the subject innovation will be appreciated by those of ordinary skill in the art upon reading and understanding the following detailed description.

BRIEF DESCRIPTION OF THE DRAWINGS

The file of this patent contains at least one drawing executed in color. Copies of this patent with color drawings(s) will be provided by the United States Patent and Trademark Office upon request and payment of the necessary fee.

The innovation may take form in various components and arrangements of components, and in various steps and arrangements of steps. The drawings are only for purposes of illustrating various aspects and are not to be construed as limiting the invention.

FIG. 2 illustrates a dual-motion parking brake actuation and release device that can be employed in conjunction with the various systems and devices described herein.

FIG. 3 illustrates the dual-motion parking brake actuation and release device in an unlocked position, such as after the operator has twisted and pushed downward on the top collar of the collar device.

DETAILED DESCRIPTION

Figure 1:
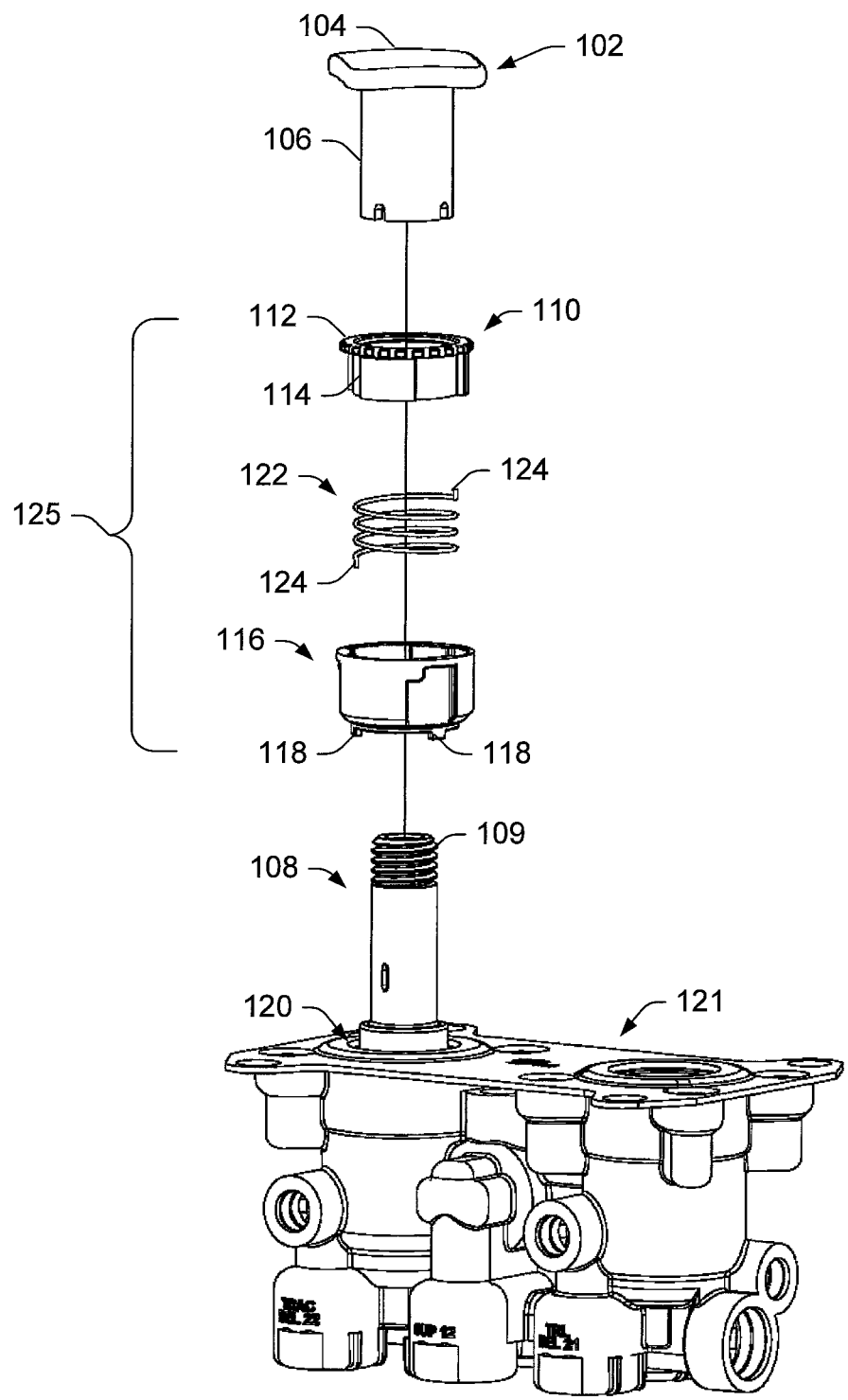
FIG. 1 illustrates an exploded view of a dual motion parking brake release arrangement that provides an additional step to parking brake release, in order to prevent unintentional parking brake release such as can occur with conventional single-motion parking brake actuators.

FIG. 1 illustrates an exploded view of a dual motion parking brake release arrangement that provides an additional step to parking brake release, in order to prevent unintentional parking brake release such as can occur with conventional single-motion parking brake actuators (e.g., knobs or buttons or the like). A plunger knob or handle 102 has a head portion 104 that can be pressed by an operator, and a body portion 106 that slides over a plunger stem 108. In one embodiment, the plunger stem is threaded 109 and the knob 102 is screwed into place on the plunger stem to secure the knob to the plunger stem. This configuration is similar to conventional single motion arrangements, in which an operator pulls the knob outward to an actuated position in which the parking brake is actuated (i.e., air is exhausted from the parking brake system to prevent the vehicle from rolling).

In contrast to conventional systems, the arrangement shown in FIG. 1 further includes a top collar 110 that includes a rim portion 112 and a body portion 114, and a bottom collar 116 that includes tabs 118 that fit into slots on a plunger guide 120 into which the plunger stem 108 is installed and thereby coupled to a valve assembly 121 that controls one or more valves for actuating and releasing the parking brake. The tabs 118 prevent the bottom collar from rotating. A spring 122 having a tang 124 at each end is disposed between the top collar 110 and the bottom collar 116 and provides an axial biasing force to the top collar 110. The tangs 124 lock the ends of the spring 122 in position relative to the top collar 110 and the bottom collar 116 so that when the top collar 110 is twisted to permit depression of the knob 102, the spring provides a rotationally biasing force that returns the top collar 110 to its locked position, thereby preventing depression of the knob and retaining the parking brake in an actuated state. Collectively, the top collar 110 and bottom collar 116, with the spring 122 interposed there between, form a collar device 125 that adds an additional motion to the act of releasing the parking brake.

According to one embodiment, the collar device 125 includes the two interlocking collars 110, 116 and the spring 122 interposed there between, which are installed over the plunger stem 108 between the plunger guide 120 and the knob 102. The lower collar 116 is prevented from rotating by virtue of the tabs 118, which interface with a plurality of ribs or receiving slots on the plunger guide 120. The upper collar 110 is held in position by the knob 102 (i.e., coupling of the knob to the plunger stem prevents the spring 122 from pushing the top collar 110 off of the assembly). The spring 122 maintains the upper collar 110 in a locked position (relative to the lower collar 116) when the parking brakes are applied (i.e. when the knob 102 is in the outward position). To release the parking brake, the upper collar 110 is twisted until interlocking feature(s) thereon are aligned with a complementary opening(s)

in the lower collar 116, which allows the knob 102 to be pushed in, releasing the parking brakes. In this manner, the dual motion (twist and push) process permits an operator to release the parking brake by rotating the upper collar 110 in a first motion, and then depressing the knob 102 in a second motion. The dual motion actuation facilitates reducing accidental brake release that can occur using a conventional single-motion brake release knob.

In one embodiment, a device comprising the upper collar, lower collar, and spring interposed there between is provided as a retrofit solution that can be installed by unscrewing or otherwise removing the park brake knob, sliding the spring and collar assembly over an existing plunger stem, and reinstalling the park brake knob. In this manner, the collar device is easily installed on existing brake actuation controls without any modifications to existing parts or components. The collar device may be provided as a kit whereby an installer assembles the top and bottom collars with the spring there between during installation, or as a pre-assembled device that is installed as a single unit.

FIG. 2 illustrates a dual-motion parking brake actuation and release device 200 that can be employed in conjunction with the various systems and devices described herein. The device 200 is shown in the actuated (parked) position in FIG. 2, and includes the knob 102, which passes through the collar device 125 including the top collar 110, the bottom collar 116, and the spring 122 interposed there between. The knob 102 is coupled (e.g., via a threaded coupling or other coupling means, which may be mechanical, chemical, etc.) to the plunger stem 108, which in turn is coupled to the plunger guide 120 that is further coupled to a valve 201. The bottom collar 116 is prevented from rotating by a plurality of ribs 202 that interface with tabs 118 (FIG. 1) on the bottom collar 116. The assembled device 200 is a portion of a valve which is mounted in a vehicle dashboard or module thereon, the surface of which is represented approximately by the dashed line 204. That is, to an operator viewing the assembled, installed device 200, the top of the plunger guide 120 is visible while the remainder of the plunger guide 120 and the valve 201 to which it is attached are not visible.

The top collar 110 includes a first or top-collar interlocking feature 210 that abuts a second or bottom-collar interlocking feature 212 on the bottom collar 116, and a first or top interlocking recess 214 that receives the second interlocking feature 212 when the collar device 125 is actuated. The second interlocking feature 212 includes a horizontal (relative to the page) interlocking surface 216 that prevents the top collar 110 from being actuated in a vertical direction, thereby preventing depression of the plunger knob 102 unless the top collar 110 is first rotated. The second interlocking feature 212 also includes a vertical (relative to the page) interlocking surface 218 that prevents the top collar 110 from being rotated counterclockwise (e.g., by an operator or by the rotational bias force provided by the spring 122).

It will be appreciated that the top collar 110 may comprise multiple interlocking features 210 around its circumference, and multiple recesses 214 for receiving interlocking features 212 on the bottom collar 116. Similarly, the bottom collar 116 may comprise multiple interlocking features 212 and recesses for receiving the interlocking features 210 on the top collar 110. To actuate the parking brake release, an operator rotates the top collar 110 clockwise (in the illustrated example) while pushing downward, as illustrated by the dashed arrows A and B, respectively.

FIG. 3 illustrates the dual-motion parking brake actuation and release device 200 in an unlocked position, such as after the operator has twisted and pushed downward on the top collar 110 of the collar device 125. The top collar has been rotated off of and away from the interlocking surfaces of the bottom interlocking features 212, such that the interlocking features 210 on the top collar 110 are aligned with recesses or spaces between interlocking features 212 on the bottom collar 116, and interlocking features 212 on the bottom collar 116 are aligned with recesses 214 on the top collar 110. The top collar 110 has also been pushed downward to mate with the bottom collar 116, in an unlocked position. The collar device 125 remains in the unlocked position as long as the operator applies sufficient downward force on the top collar 110 to maintain the unlocked position. While the collar device 125 is in the unlocked position, the operator depresses the plunger knob 102 to actuate the parking brake release, as indicated by the dashed arrow C. Once the plunger knob is depressed, the operator may release the collar device. In one example, the operator twists and pushes downward on the top collar 110 in a single fluid motion to unlock the dual-motion release device 200, and then depresses the plunger knob with the palm of his hand, which is already on the knob.

Once the operator pulls the plunger knob 102 (applies parking brake), the spring 122 inside the collar device 125 forces the top collar 110 upward until a bottom edge of the top interlocking features 210 clears the horizontal interlocking surface 216 on the bottom interlocking features 212, and at which point a torsional load provided by the spring twists the top collar counterclockwise until the interlocking features 210 on the top collar 110 abut the vertical interlocking surfaces 218 on the bottom interlocking features 212. It will be appreciated that the foregoing examples are presented by way of illustration only, and that the direction of actuation may be reversed to be made counterclockwise in one embodiment.

Figure 4:
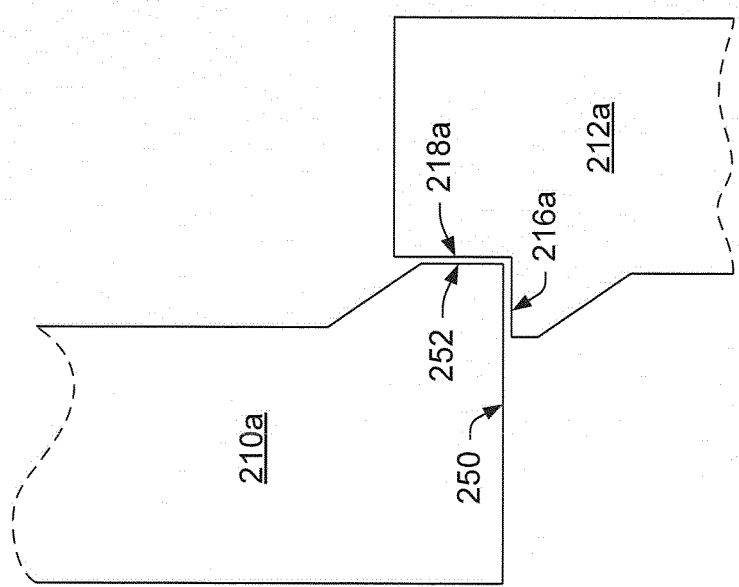
FIG. 4 illustrates an interlocking arrangement comprising a top interlocking feature and a bottom interlocking feature shown in the locked position.

FIG. 4 illustrates an interlocking arrangement comprising a top interlocking feature 210a and a bottom interlocking feature 212a. A plurality of such top and bottom interlocking features may be employed on each of a top collar and a bottom collar of a collar device 125, such as is described with regard to the preceding figures. The top interlocking feature 210a has a horizontal interlocking surface 250 that interfaces with a horizontal interlocking surface 216a on the bottom interlocking feature 212a, and a vertical interlocking surface 252 that interfaces with a vertical interlocking surface 218a on the bottom interlocking feature 212a when the collar device in which the interlocking features 210a and 212a are employed is in a locked position. That is, a spring (e.g., the spring 122 of the preceding figures) provides a rotational bias that forces the vertical surface 252 against the vertical surface 218a, which in turn aligns the horizontal interlocking surfaces 250, 216a so that a plunger knob on which the collar device is employed cannot be depressed.

Figure 5:
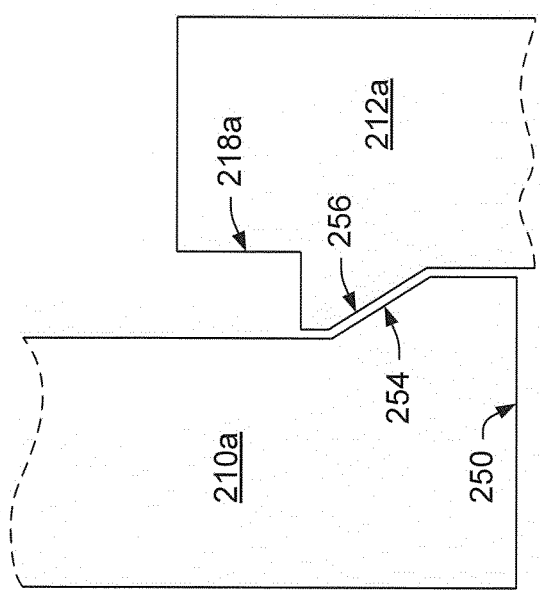
FIG. 5 illustrates the top interlocking feature and the bottom interlocking feature in an unlocked position relative to each other.

FIG. 5 illustrates the top interlocking feature 210a and the bottom interlocking feature 212a in an unlocked position relative to each other, such as when an operator applies and maintains force to twist and push downward on the top collar (i.e. contrary to the upward and rotational forces provided by the spring in the collar device). The top interlocking feature 210a includes a camming surface 254 that interfaces with a complementary camming surface 256 on the bottom interlocking feature such that when the operator pulls out the plunger knob, or the plunger knob pops out due to low system pressure, the upward force of the spring 122 (FIGS. 1-2) lifts the top collar upward. Concurrently, the camming surfaces interact to rotate the upper collar against the rotational bias of the spring (i.e., clockwise in the illustrated examples, without being limited thereto) until the horizontal edge 250 of the top collar interlocking feature(s) clears the horizontal interlocking surface 216a of the bottom interlocking feature(s), at which point the rotational bias of the spring snaps the upper collar counterclockwise until it abuts the vertical interlocking surface 218a. By varying the pitch of the cam surfaces (254, 256) and the torsional component of the spring 122, the axial load from the spring (122) on the plunger guide 120 is minimized. At this point, the interlocking features 210a, 212a of the collar device have returned to their locked position, as shown in FIG. 4, and the plunger knob is prevented from being actuated (i.e., the parking brake remains in an ON position.)

Figure 7:
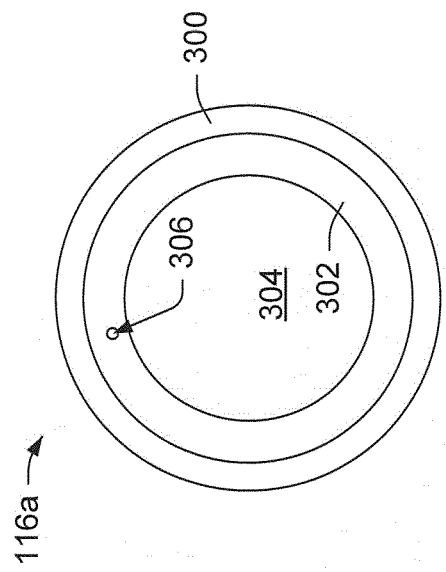
FIG. 7 illustrates a top view of the bottom collar, showing the sidewall and bottom portion, which defines an aperture through which the plunger stem passes.
Figure 6:
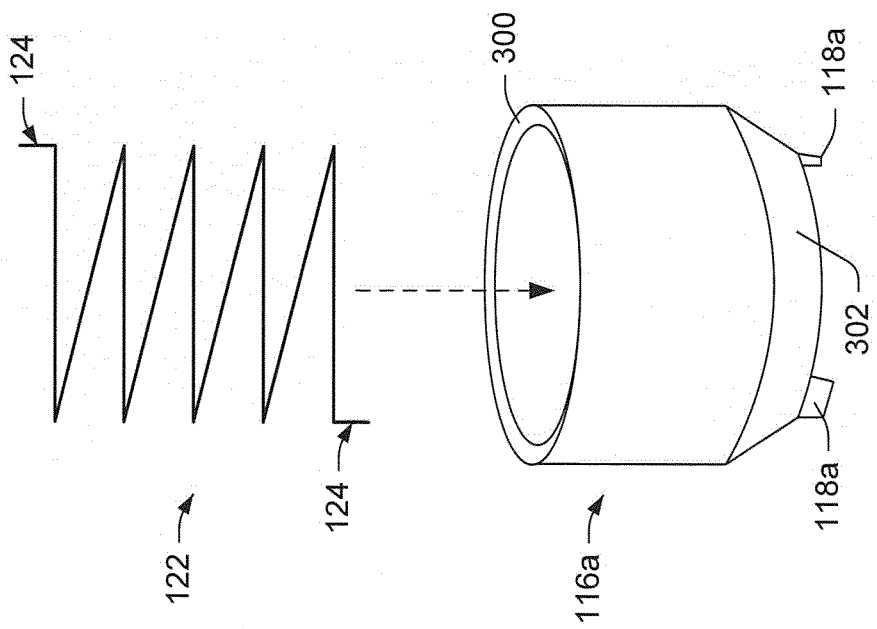
FIG. 6 illustrates an example of a bottom collar such as may house, and be coupled to, a spring to achieve linear and rotational bias on a top collar according to various aspects described herein.

FIGS. 6 and 7 illustrate an example of a bottom collar 116a such as may house, and be coupled to, a spring 122 to achieve linear and rotational bias on a top collar (not shown) according to various aspects described herein. In FIG. 6, the bottom collar 116a is shown without interlocking features for simplicity; however, it will be appreciated that the bottom collar 116a can include interlocking features and recesses as described with regard to the preceding figures. For instance, the interlocking features may be formed directly out of a sidewall 300 of the collar 116a, or may be formed on an interior of the sidewall 300. The collar 116a also includes a tapered bottom portion 302 that includes tabs 118a that interface with ribs or grooves on a plunger guide 120 (FIGS. 1-3). In one embodiment the tabs 118a are snap tabs that have a camming surface thereon for biasing the tabs inward when inserted into corresponding grooves on the plunger guide, and then snapping into place to rigidly couple the bottom collar to a portion of the valve assembly, such as the plunger guide, or stationary surface of the valve mounting area on the vehicle. In a second embodiment, a different anti-rotation feature can be used, such as a fastener holding the collar to a mounting plate or the valve assembly.

A spring 122 includes a tang 124 at each end. In one embodiment, each tang is oriented parallel to a longitudinal axis through the spring and along which the spring exerts a linear force when housed in the collar device, although other orientations of the tangs relative to the spring are envisioned and may be employed as will be appreciated by those of skill in the relevant art. The spring is inserted into the bottom collar 116a and coupled thereto during installation on a parking brake plunger assembly or during preassembly for distribution and subsequent installation.

FIG. 7 illustrates a top view of the bottom collar 116a, showing the sidewall 300 and tapered bottom portion 302, which defines an aperture 304 through which the plunger stem 108 (FIG. 1) passes. A small receiving hole 306 is positioned in interior surface of the bottom portion and receives a tang 124 on the spring 122. A similar receiving hole is formed in an interior of the top collar (not shown) for receiving the tang 124 at the opposite end of the spring 122. When the top and bottom collars are coupled together to form the collar device 125 (FIGS. 1-3) with the spring position therein, the spring 122 is compressed and therefore exerts a force that maintains the tangs 124 in the respective receiving holes 306.

In order to provide a desired torsional load in the spring 122 when installed in the collar device, the tangs 124 may be positioned at first and second positions (e.g., 180° apart on the circumference of the spring 122, or some other desired positions) relative to each other, and the receiving holes may be offset by a different amount (e.g., 120° apart on the interior circumference of the top and bottom collars, respectively). The spring is then inserted into the bottom collar, with a tang 124 in the receiving hole 306. The opposite tang is then inserted into the receiving hole in the top collar, and the top collar is twisted until the interlocking features of both collars 110, 116 align, at which point the top and bottom collars can be mated together. The rotation of the top collar to align it with the bottom collar creates a torsional load in the spring (i.e., mechanical energy is stored in the spring) to maintain the upper collar in a locked position relative to the lower collar. Similarly, because the spring is compressed linearly during assembly or installation of the collar device, mechanical energy is stored in a linear direction and harnessed to bias the top collar upward so that the torsional load of the twisted spring can operate to maintain the collar device in a locked position when not actively manipulated by an operator employing the described dual-motion. It will be appreciated that the spring parameters are selected to achieve the desired linear and rotational biases while permitting the described devices to be easily operated by an operator using a single hand.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A two-stage parking brake release actuation system, comprising:
    a collar device that includes a compressed and torsionally loaded spring that maintains the collar device in a locked position in which actuation of a brake release plunger knob is prevented;
    a plunger stem over which the collar device is installed and which passes through the spring in the collar device;
    a plunger guide to which the plunger stem and the collar device are coupled; and
    a plunger knob that is coupled to the plunger stem and which holds the collar device in place between the plunger knob and the plunger guide;
    wherein the collar device is rotatable and compressible to unlock the collar device in order to permit actuation of the plunger knob.

2. The system according to claim 1, wherein the collar device comprises:
    a top collar with first interlocking features and first recesses; and
    a bottom collar with second interlocking features and second recesses between the interlocking features.

3. The system according to claim 2, wherein the second interlocking features each comprise a horizontal interlocking surface that prevents the top collar from being depressed to unlock the collar device and permit plunger knob actuation.

4. The system according to claim 3, wherein the second interlocking features each comprise a vertical interlocking surface against which the spring torsionally forces respective first interlocking features, wherein each first interlocking feature includes a first camming surface, and wherein each second interlocking feature includes a second camming surface.

5. The system according to claim 2, wherein the top collar is rotatable to align the first interlocking features with corresponding second interlocking recesses, and align the second interlocking features with corresponding first interlocking recesses, and wherein the top collar is depressible to compress the spring and unlock the collar device to permit actuation of the plunger knob.

6. The system according to claim 4, wherein the camming surfaces interface when the top collar is depressed into an unlocked position, and wherein upon release of the top collar by an operator, the compressed spring forces the top collar upward while the camming surfaces interact to increase torsional load in the spring, and wherein the axial load forces the interlocking features back toward the vertical interlocking surface once the spring has forced the top collar upward.

7. The system according to claim 4, wherein the top collar is rotatable by an operator to align the first interlocking features with corresponding second interlocking recesses, and align the second interlocking features with corresponding first interlocking recesses, and wherein the top collar is depressible by the operator to compress the spring and unlock the collar device to permit actuation of the plunger knob.

8. The system according to claim 7, wherein upon release of the top collar by the operator, the compressed spring forces the top collar upward, and wherein the torsional load on the spring forces the interlocking features back toward the vertical interlocking surface once the spring has forced the top collar upward.

9. The system according to claim 2, wherein the spring includes a tang at each end, and wherein each of the top collar and the bottom collar includes a receiving hole into which the tangs are inserted to couple the spring to the top collar and the bottom collar respectively, such that a first end of the spring is stationary relative to the top collar and a second end of the spring is stationary relative to the bottom collar, and wherein rotation of the top collar adjusts torsional load on the spring.

10. The system according to claim 1, wherein the plunger knob passes through at least a portion of the collar device.

11. A collar device that facilitates locking a plunger knob in position to prevent accidental actuation of the plunger knob, comprising:
   a top collar with first interlocking features and first recesses;
   a bottom collar with second interlocking features and second recesses between the interlocking features;
   a spring interposed between, and coupled to, the top collar and the bottom collar, the spring being torsionally loaded and compressible so that the top collar remains in locked position relative to the bottom collar and prevents unintentional actuation of a plunger knob on which the collar device is mounted;
   wherein the bottom collar includes a plurality of tabs that couple the collar device to a plunger guide, which is also coupled to a plunger stem that passes through the spring in the collar device and is coupled to the plunger knob at an opposite side of the collar device.

12. The device according to claim 11, wherein the second interlocking features each comprise a horizontal interlocking surface that prevents the top collar from being depressed to unlock the collar device and permit plunger knob actuation.

13. The device according to claim 12, wherein the second interlocking features each comprise a vertical interlocking surface against which the spring torsionally forces respective first interlocking features and maintains the top collar in the locked position.

14. The device according to claim 13, wherein each first interlocking feature includes a first camming surface, and wherein each second interlocking feature includes a second camming surface.

15. The device according to claim 13, wherein the top collar is rotatable to align the first interlocking features with corresponding second interlocking recesses, and align the second interlocking features with corresponding first interlocking recesses, and wherein the top collar is depressible to compress the spring and unlock the collar device to permit actuation of the plunger knob.

16. The device according to claim 15, wherein the camming surfaces interface when the top collar is depressed into an unlocked position, and wherein upon release of the top collar by an operator, the compressed spring forces the top collar upward while the camming surfaces interact to increase torsional stress in the spring, and wherein the torsional load forces the interlocking features back toward the vertical interlocking surface once the spring has forced the top collar upward.

17. The device according to claim 13, wherein the top collar is rotatable by an operator to align the first interlocking features with corresponding second interlocking recesses, and align the second interlocking features with corresponding first interlocking recesses, and wherein the top collar is depressible by the operator to compress the spring and unlock the collar device to permit actuation of the plunger knob.

18. The device according to claim 17, wherein upon release of the top collar by the operator, the compressed spring forces the top collar upward, and wherein the torsional load on the spring forces the interlocking features back toward the vertical interlocking surface once the spring has forced the top collar upward.

19. The device according to claim 11, wherein the spring includes a tang at each end, and wherein each of the top collar and the bottom collar includes a receiving hole (306) into which the tangs are inserted to couple the spring to the top collar and the bottom collar respectively, such that a first end of the spring is stationary relative to the top collar and a second end of the spring is stationary relative to the bottom collar, and wherein rotation of the top collar adjusts torsional load on the spring.

20. The device according to claim 11, wherein the plunger guide is coupled to a parking brake control valve, and wherein depression of the plunger knob actuates a parking brake release mechanism and pulling of the plunger knob permits the spring to return the collar device to a locked position.

* * * * *